United States Patent

Lindell et al.

Patent Number: 5,845,217
Date of Patent: Dec. 1, 1998

[54] POWER SYSTEMS FOR PLUG-IN MODULES

[75] Inventors: Bo Karl Lindell, Lindgö ; Roland Thomas Wilhelm Johansson, Hässelby, both of Sweden

[73] Assignee: Ericsson Inc., Research Triangle Park, N.C.

[21] Appl. No.: 593,392

[22] Filed: Jan. 29, 1996

Related U.S. Application Data

[63] Continuation of Ser. No. 122,078, Sep. 15, 1993, abandoned.

[51] Int. Cl.$^6$ ........................................................ H04B 1/38
[52] U.S. Cl. ........................... 455/557; 455/573; 455/575; 455/90; 455/127
[58] Field of Search .................... 455/89, 90, 127, 455/128, 129, 348, 349, 350, 351, 269, 550, 556, 557, 558, 572, 573, 574, 575; 379/58; 375/222; 235/492

[56] References Cited

U.S. PATENT DOCUMENTS

| | | | |
|---|---|---|---|
| 4,381,458 | 4/1983 | Anstey et al. | 307/66 |
| 4,680,674 | 7/1987 | Moore | 361/395 |
| 4,731,869 | 3/1988 | Farrer | 455/127 |
| 5,018,051 | 5/1991 | Yamada et al. | 361/393 |
| 5,020,090 | 5/1991 | Morris | 379/58 |
| 5,028,806 | 7/1991 | Stewart et al. | 307/66 |
| 5,043,721 | 8/1991 | May | 340/825.44 |
| 5,109,540 | 4/1992 | Dzung et al. | 455/90 |
| 5,157,247 | 10/1992 | Takahira | 235/492 |
| 5,161,803 | 11/1992 | Ohara | 273/435 |
| 5,183,404 | 2/1993 | Aldous et al. | 439/55 |
| 5,185,700 | 2/1993 | Bezos et al. | 364/424.04 |
| 5,201,066 | 4/1993 | Kim | 455/89 |
| 5,202,838 | 4/1993 | Inoue | 364/480 |
| 5,335,276 | 8/1994 | Thompson et al. | 380/21 |
| 5,361,061 | 11/1994 | Mays et al. | 455/269 |
| 5,373,149 | 12/1994 | Rasmussen | 235/492 |
| 5,373,300 | 12/1994 | Jenness et al. | 455/102 |
| 5,628,055 | 5/1997 | Stein | 455/89 |

FOREIGN PATENT DOCUMENTS

| | | |
|---|---|---|
| 0 508 685 A3 | 10/1992 | European Pat. Off. |
| 0546680 | 6/1993 | European Pat. Off. |
| 0599244 | 6/1994 | European Pat. Off. |
| 0629071 | 12/1994 | European Pat. Off. |
| 27 47 452 A1 | 4/1978 | Germany. |
| 2279852 | 7/1994 | United Kingdom. |
| 2286095 | 7/1994 | United Kingdom. |
| WO 91/07837 | 5/1991 | WIPO. |
| WO 94/121058 | 3/1994 | WIPO. |

OTHER PUBLICATIONS

"AT&T Paradyne Offers PCMCIA Modem for Nokia Portables", *Mobile Data Report*, Mar. 15, 1993, pp. 4–6.

*Primary Examiner*—Reinhard J. Eisenzopf
*Assistant Examiner*—Thanh Le
*Attorney, Agent, or Firm*—Jenkens & Gilchrist P.C.

[57] ABSTRACT

A system for supplying primary electrical power to modular components of electronic equipment. The system uses a battery power source mounted either in the module or as part of a battery pack that attaches to the module. Module circuitry supplies a recharge current to the battery power source. A charge circuit charges the batteries in a parallel and supplies power to the module by connecting the batteries in series. Circuitry also determines the amount of battery power source used for an operation of the module and sends a recharge current to the battery power source corresponding to the power consumed by the module and based on the available recharge current.

27 Claims, 9 Drawing Sheets

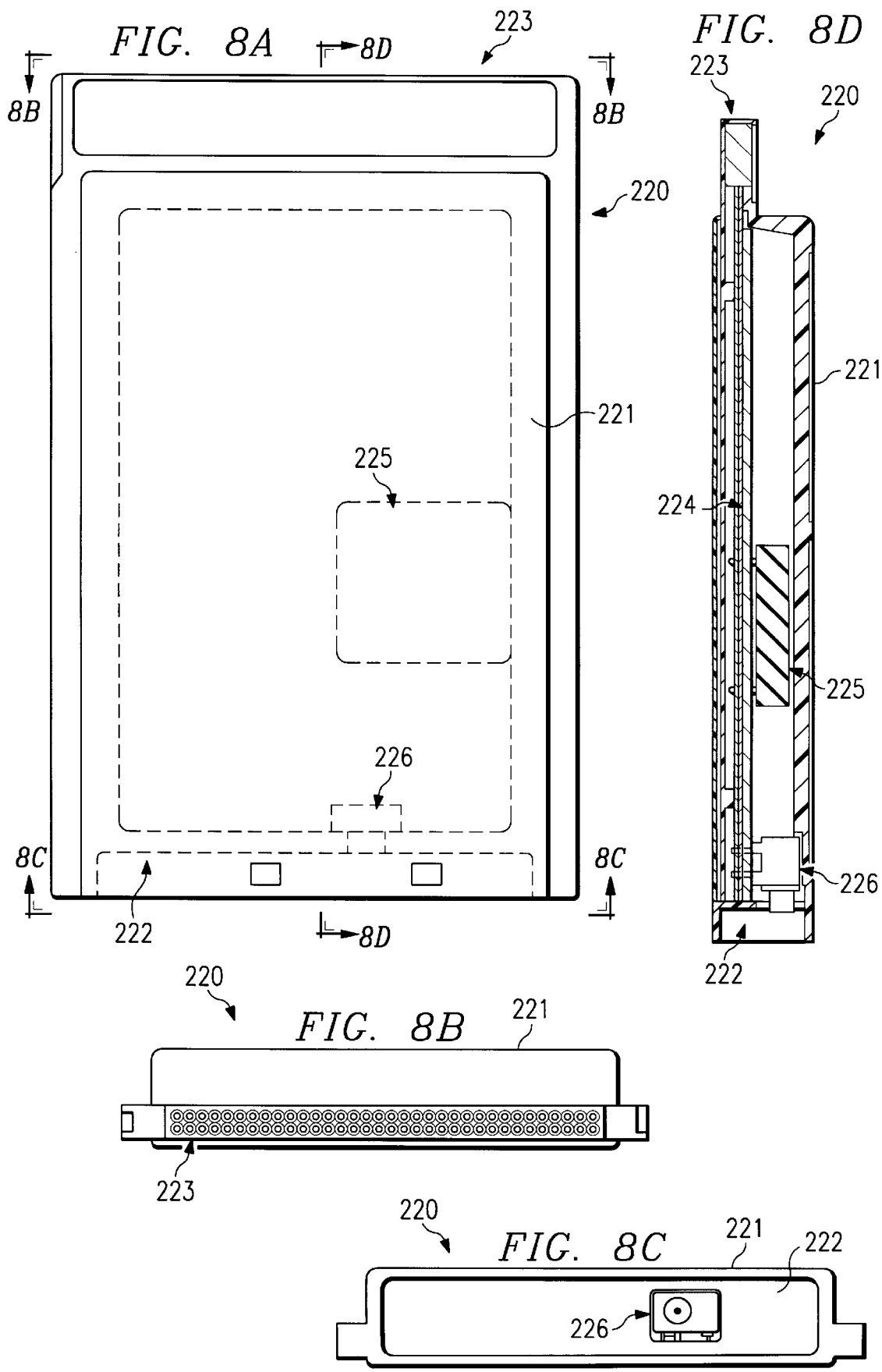

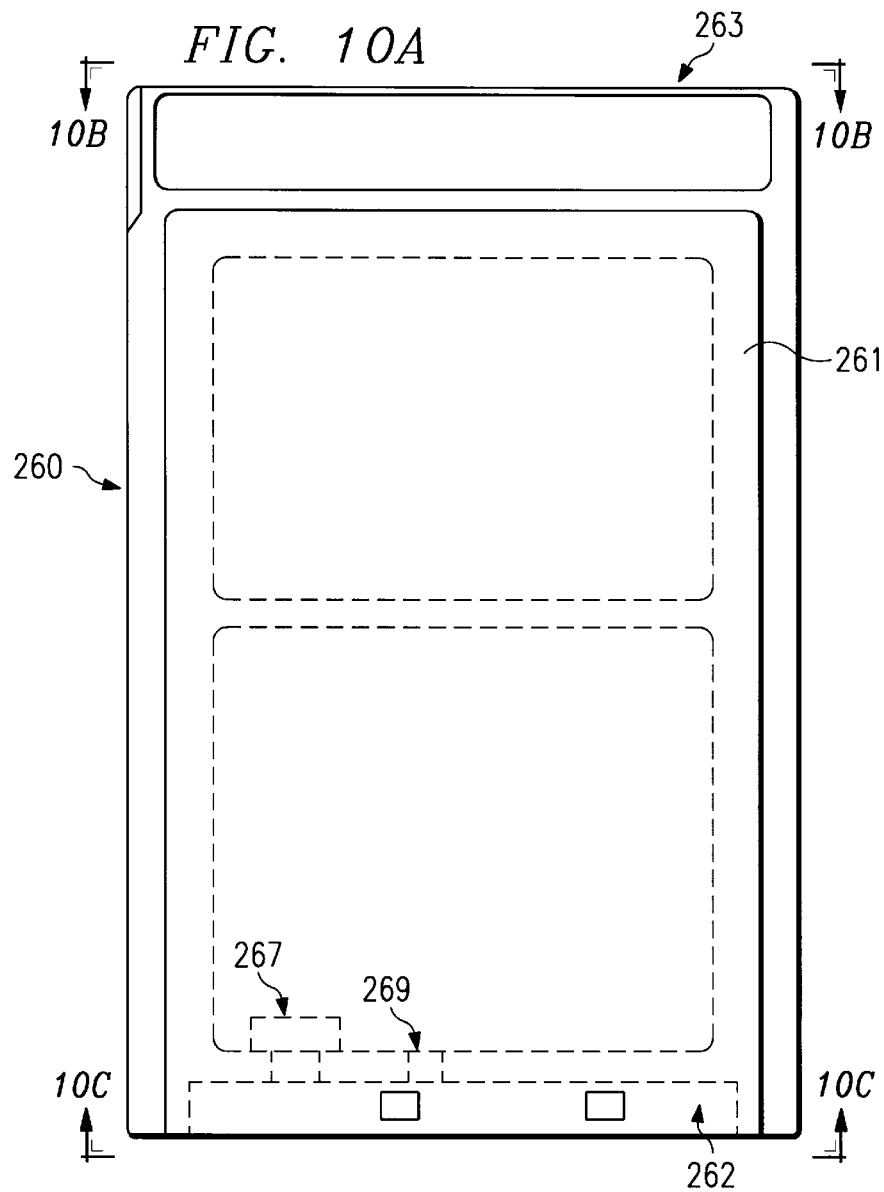
FIG. 10A
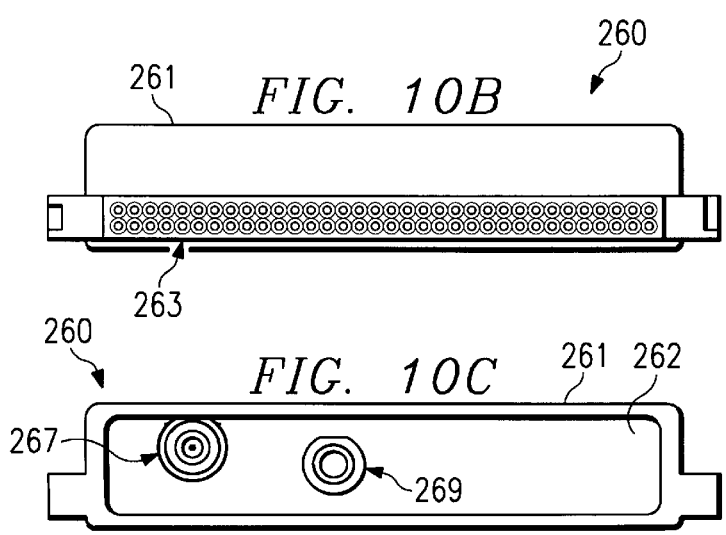
FIG. 10B
FIG. 10C

POWER SYSTEMS FOR PLUG-IN MODULES

This is a Continuation of application Ser. No. 08/122,078 filed on Sep. 15, 1993, abandoned.

CROSS-REFERENCE TO RELATED APPLICATIONS

This application is related to copending U.S. patent application Ser. No. 08/026,478 filed Mar. 04, 1993, entitled "Modular Radio Communications System" by inventor Per Stein; is assigned to the assignee of the present invention; and is hereby incorporated herein in its entirety by this reference thereto.

BACKGROUND OF THE INVENTION

1. Field of the Invention

The present invention relates to modular electronic equipment and, more particularly to modular mounted electronic components and/or units requiring supplemental electrical power.

2. History of the Prior Art

Electronic systems have experienced marked technological advances in recent years. One of those advances is the use of modular electronic components or units in electronic systems. Modular electronic components, such as plug-in modules, have allowed the replacement of circuit components of electronic systems without unnecessarily disassembling and reassembling the electronic system itself.

Modular electronic units have also allowed basic electronic systems to expand their capabilities and functions. Electronic systems have been designed to accept standard format plug-in modules. Plug-in modules meeting the standard format can be designed with different functions for use with the electronic system. In this manner the plug-in modules with this standard format can be exchanged when the user wishes to change the additional features provided by those plug-in modules.

As an example, there has been a recent movement toward standardizing the interconnection formats for use in circuit cards for personal computers. In particular, the PC & Memory Card International Association (PCMCIA) was formed with the goal of promoting the interchangeability of integrated circuit and memory cards among computer and other types of electronic products. Toward this end, the PCMCIA has promulgated certain physical and electrical standards to ensure that cards will be able to be used in different pieces of equipment. Both data storage, i.e. memory, and peripheral expansion, i.e. I/O, card types constructed in accordance with these standards should be able to be used in any connectors also constructed in accordance with the standards. Therefore, computer systems using the PCMCIA format will be able to exchange modules, thereby expanding the possible functions for the host computer system.

Other advances in electronic systems have involved the miniaturization of computer systems and electronic components. Personal computers, for example, have become smaller and more efficient in their progression through desk top, laptop, notebook, and palm top versions. However, this progression of miniaturization has placed certain constraints on the plug-in modules used by these systems.

Plug-in modules typically require power from the host equipment. As electronic equipment has become miniaturized, the available power from the electronic equipment for use by a plug-in module has become limited. This limitation is best illustrated by the miniaturization of personal computers into laptop or palm top versions. The portability requirement of these systems prevents the use of unlimited power from stationary sources, such as wall sockets. The miniaturization of the host systems places restrictions on battery size for powering the host systems and the plug-in modules. These two limitations result in severe limitations on the available power for plug-in modules. However, many plug-in modules, such as disk drives or radio transceivers, require larger voltages, higher peak current capability, greater total power capability, or a combination thereof, than many host systems can supply with these limitations on the available power for plug-in modules.

Some plug-in modules contain back-up batteries for use when the supply power from the host equipment is lost. Modules containing back-up batteries are typically memory modules which require a small sustaining power at all times. The aim of a back-up battery is to provide the plug-in module with a very small sustaining power when power from the host equipment is lost. However, plug-in modules requiring a higher power source during operation are not aided by a back-up battery.

It would be an advantage therefore, to provide a plug-in module with a power source that can aid the plug-in module during operation when power supplied by the host equipment is insufficient for the operation of the module. The system of the present invention and various components thereof provides such advantages.

SUMMARY OF THE INVENTION

The present invention generally relates to modular electronic equipment. More particularly, the present invention provides a system for providing primary electrical power for modular mounted electronic components, or units, mounted in host electronic equipment.

In one aspect of the present invention, the modular electronic component contains a battery power source which supplies electrical power to the modular electronic component for powering the operations and functions of the modular electronic component. In another aspect of the present invention, a battery pack, having a battery power source, removably attaches to the modular electronic component for providing primary electrical power to the modular electronic component.

In a further aspect of the present invention, the host electronic equipment supplies power to the modular electronic component and the battery power source supplements the electrical power from the host electronic equipment. In yet a further embodiment of this aspect of the present invention, the battery power source only supplies electrical power to the modular electronic component when the electrical power from the host electronic equipment is insufficient for the operations of the modular electronic equipment.

In a further aspect of the present invention, the battery power supply is a plurality of batteries electrically connected in a series arrangement.

In a further aspect of the present invention, the modular electronic component contains a radio transmitter and the battery power supply provides electrical power to operate the transmitter. In yet a further aspect of the present invention, the transmitter has a higher power consumption rate for use with the battery power source, and a lower power consumption rate for use without the battery power source, and the modular electronic component has a means for switching the transmitter between the two levels of consumption. In yet a further aspect of the present invention, the means for switching the transmitter power consumption level can automatically switch from the higher consumption power level to the lower consumption level, and back, depending on the ability of the battery power source to supply the required electrical power. In yet a further aspect of the present invention, the switching means can sense when the battery pack is attached to the modular electronic component and switches the transmitter to the higher power consumption level when the battery pack is attached and to the lower power consumption level when the battery pack is not attached.

In a further aspect of the present invention, a charging circuit provides a current for recharging the battery power source. In yet a further aspect of the present invention, the charging circuit resides in the host electronic equipment. In yet a further aspect of the present invention, the charging circuit resides in the modular electronic component. In yet a further aspect of the present invention, the charging circuit resides in the battery pack.

In another aspect of the present invention, the modular electronic component includes a battery power source which supplies electrical power to the modular electronic component and has a power capacity sufficient to supply a limited number of high current demand operations by the modular electronic component, and the modular electronic component extends the number of high current demands that the battery power supply can perform, by recharging the battery power supply from a recharge current supplied by the host electronics. In a further aspect of the present invention, the modular electronic component is a PCMCIA module and the battery power supply is recharged from the twelve volt power source supplied to the PCMCIA type module by the host electronics. In yet a further aspect of the present invention, the battery power supply is recharged from the five volt power supply when the twelve volt power supply is not available, and the battery power source has two batteries connected in series when the demand for power is high and in parallel for recharging when the demand for power is low.

In another aspect of the present invention, the modular electronic component includes a battery power source and a control circuit that calculates the amount of charge used by the modular electronic component and sends a corresponding charge to the battery power source when the demand for power is lower. In a further aspect of the present invention, the modular electronic unit is a PCMCIA type module with a burst-mode radio transmitter.

In another aspect of the present invention, the modular electronic component is a PCMCIA type module with a battery power source for supplying electrical power to the PCMCIA type module. In a further aspect of the present invention, the battery power supply is part of a battery pack which is detachably attached to the PCMCIA type module. In yet a further aspect of the present invention, the PCMCIA type module contains a radio transmitter.

In a further aspect of the present invention, the transmitter of the PCMCIA type module has a higher power consumption rate for use with the battery power source, and a lower power consumption rate for use without the battery power source, and the modular electronic component has a means for switching the transmitter between the two levels of consumption. In yet a further aspect of the present invention, the means for switching the transmitter power consumption level can automatically switch from the higher consumption power level to the lower consumption level, and back, depending on the ability of the battery power source to supply the required electrical power. In yet a further aspect of the present invention, the switching means can sense when the battery pack is attached to the modular electronic component and switches the transmitter to the higher power consumption level when the battery pack is attached and to the lower power consumption level when the battery pack is not attached.

In a further aspect of the present invention, a charging circuit provides a current for recharging the battery power source. In yet a further aspect of the present invention, the charging circuit resides in the host electronic equipment. In yet a further aspect of the present invention, the charging circuit resides in the PCMCIA type module. In yet a further aspect of the present invention, the charging circuit resides in the battery pack.

In a further aspect of the present invention, an antenna is rotatably attached to the battery pack and is electrically connected to the radio transmitter within the PCMCIA type module.

BRIEF DESCRIPTION OF THE DRAWINGS

For a more complete understanding of the present invention and for further objectives and advantages thereof, reference may now be had to the following description taken in conjunction with the accompanying drawings, in which:

FIG. 8A is a top elevational view of the modular telecommunications unit from FIG. 7, illustrating the various features of that embodiment of the present invention;

FIGS. 8B–D are a front elevational view, a rear elevational view, and a side elevational, cross-sectional view, respectively, of the modular telecommunications unit from FIG. 8A, further illustrating the various features of that embodiment of the present invention;

FIG. 10A is a top plan view of the modular memory unit from FIG. 9, without the battery pack, and illustrating various features of that embodiment of the present invention;

FIGS. 10B–C are a front elevational view and a rear elevational view, respectively, of the modular memory unit without a battery pack illustrated in FIG. 8A, further illustrating various features of that embodiment of the present invention;

DETAILED DESCRIPTION

Figure 1:
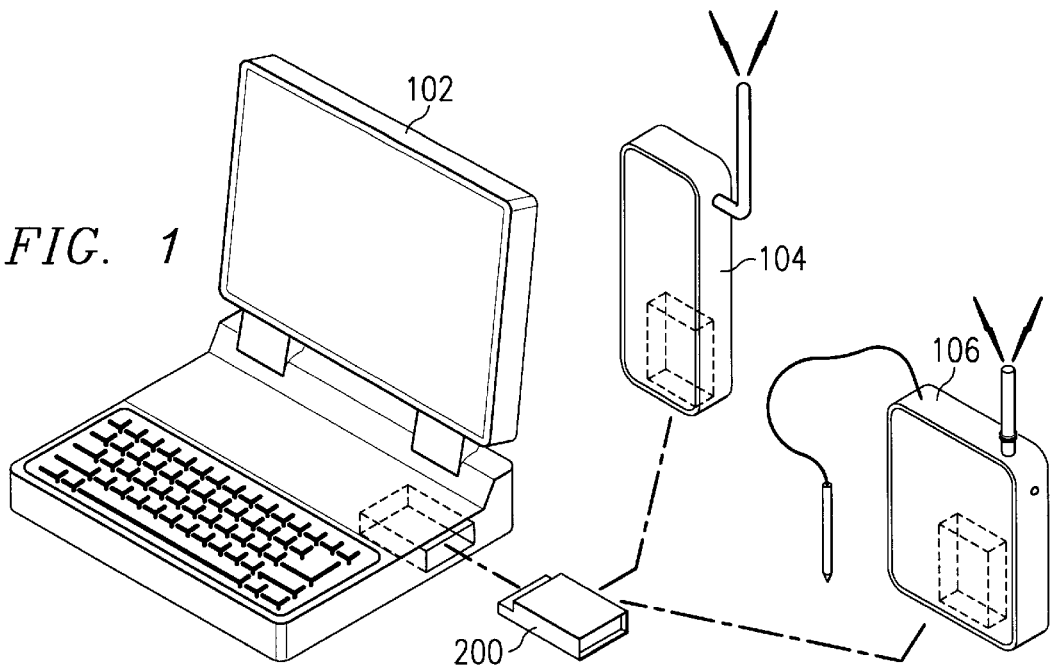
FIG. 1 is an exploded perspective view of a modular unit constructed in accordance with the present invention and illustrating multiple applications thereof.

Referring first to FIG. 1, there is shown a diagrammatical illustration of the versatility and multiple uses possible with a plug-in module 200, built according to the principles of the present invention. The plug-in module 200 contains module circuitry and a battery power source, both of which will be described in greater detail below. The module circuitry regulates the distribution of power from the battery power source to the plug-in module 200. The module circuitry can also provide a recharge current to the battery power source. The battery power source can either be built into the plug-in module 200, or a part of a battery pack that is attached to the plug-in module 200. The battery power source provides primary power to the plug-in module 200 for module operations that require a power supply greater than can be supplied by the host system. The plug-in module 200 can be designed to perform various functions for the host system. Examples of functions that can be performed by the plug-in module 200 include, but are not limited to, memory expansion, telecommunications modem, or a radio communications module. The plug-in module 200 can be designed to be interchangeable between various types of host equipment. As shown in FIG. 1, the module 200 can be used in a laptop computer 102, a cellular telephone 104, or a pen based computer 106. These types of host equipment that can use the module 200 are shown for purposes of illustration only and are not integral to, or limiting of, the present invention. Although the host equipment illustrated in the embodiments described below are laptop computers, the invention is not limited to use with computers and any type of electronic equipment could be used as the host equipment.

Figure 2:
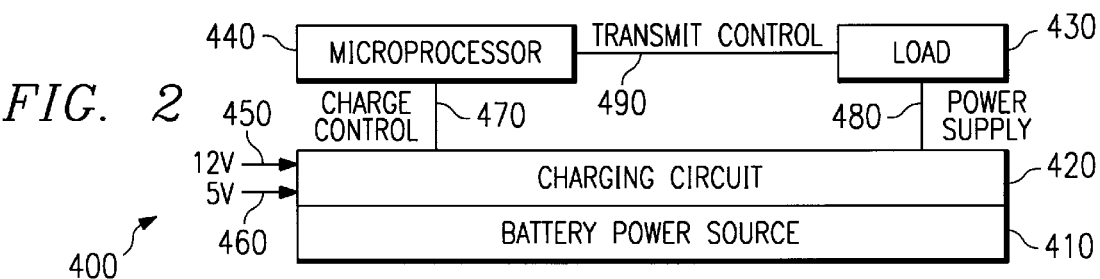
FIG. 2 is a block diagram illustrating a module circuit constructed in accordance with the principles of the present invention.

Referring now to FIG. 2, there is shown a block diagram of a preferred embodiment of a module circuit 400, constructed in accordance with the principles of the present invention. The module circuit 400 generally comprises a battery power source 410, a charging circuit 420, a load 430, and a microprocessor 440. The microprocessor 440 sends a transmit signal over a transmit control line 490, instructing the load 430 to operate for a specific time period. In order to operate, the load 430 consumes power through a power supply line 480 and at a known rate from the battery power supply 410. Because the rate of power consumption by the load 430 is a known constant, the microprocessor 440 can determine how much power the load 430 consumed from the battery power supply 410 during a specific operating period.

Still referring to FIG. 2, after the load 430 has completed an operating period, the microprocessor 440 instructs the charging circuit 420, via a charge control line 470, to send a recharge current to the battery power source 410. The recharge current from the charging circuit 420 is transmitted to the battery power source 410 at a known constant rate. The microprocessor 440 instructs the charging circuit 420 to send a recharge current to the battery power source 410 based upon the power consumed by the load 430 during the operating period. Typically the charging circuit 420 sends a recharge current to the battery power source 410 at a rate that is lower than the consumption rate by the load 430 during the operating period. Therefore, the microprocessor 440 overcomes this difference between the consumption rate and the recharge rate by instructing the charging circuit 420 to recharge the battery 410 for a longer time period. The recharging time period is determined by the microprocessor 440 based on the load 430 consumption rate, the length of the operation period, and the recharge rate. The microprocessor 440 uses these three parameters to determine a recharge time period that will recharge the battery power source 410 to its original status. Although FIG. 2 illustrates the use of the microprocessor 440, any similar type of control circuit could be used to direct the load 430 and the charging circuit 420.

Referring still to FIG. 2, the load 430 can be any electrical consuming device located within the module 200 of FIG. 1. For example, the load 430 could be a disk drive, a radio transmitter, or any other large power consuming device. Although the module circuit 400 has been illustrated receiving a 5 volt and a 12 volt power source from the host electronics, any single or combination of voltages could be used for the module circuit 400. The battery power source 410 can be either a single battery or a plurality of batteries, connected in a series or a parallel arrangement. The charging circuit 420 and microprocessor 440 are not required to be located within the module, and in fact can be located anywhere. The module circuit 400 illustrated in FIG. 2 is shown for purposes of illustration only and is not integral to, or limiting of the present invention. For example, the battery power supply 410 could be directly connected to power lines supplied to the module 200 by the host equipment, or be the sole supply of electricity for the components in the module, or the like.

Figure 3:
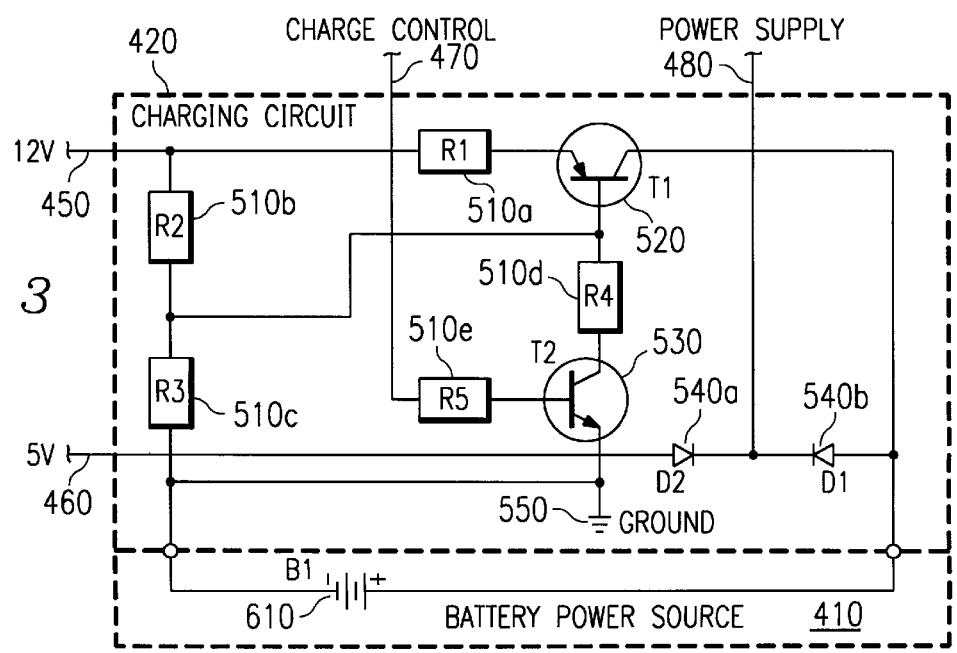
FIG. 3 is a circuit diagram of an embodiment for the charging circuit and battery power source of FIG. 2, constructed in accordance with the principles of the present invention.

Referring now to FIG. 3, there is shown a circuit diagram of an embodiment for the charging circuit 420 and battery power source 410 of FIG. 2. It can be seen that the charging circuit 420 of FIG. 3 performs an automated switching between the 5 volt power supply 460 and a battery 610 of the battery power source 410. When the voltage of the battery 610 is higher than the 5 volt power supply 460, the battery 610 supplies power through a diode 540*b* to the power supply line 480. When the voltage of the battery 610 is lower than the 5 volt power supply 460, by failure or otherwise, the charging circuit 420 supplies power to the power supply line 480 from the 5 volt power supply 460 and through the diode 540*a*.

Still referring to FIG. 3, when the charge control line 470 does not transmit a charge signal to the charging circuit 420, a transistor 530 does not conduct and a transistor 520 supplies a low charging current to the battery 610 as determined by an emitter resistor 510a, and the base bias resistors 510b–c. When the charge control line 470 does transmit a recharge signal to the transistor 530, the transistor 530 will conduct and change the bias voltage of the transistor 520 (by grounding through the resistor 510d) to a value that will give a higher charging current through the transistor 520 to the battery 610.

Figure 4:
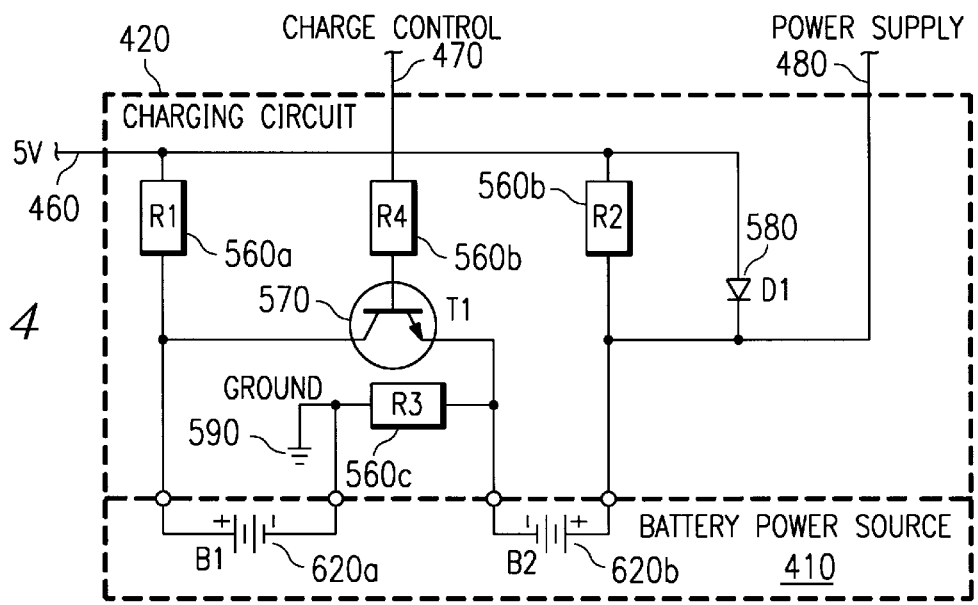
FIG. 4 is a circuit diagram of an alternate embodiment for the charging circuit and battery power source in FIG. 2, constructed in accordance with the principles of the present invention.

Referring now to FIG. 4, there is shown a circuit diagram of an alternate embodiment for the charging circuit 420 and the battery power source 410 of FIG. 2. In the embodiment shown in FIG. 4, the charging circuit 420 only requires the 5 volt power supply 460 from host electronic equipment. Also in the embodiment shown in FIG. 4, the charging circuit 420 and battery power source 410 provide the ability to connect a battery 620a with a battery 620b in a series arrangement when greater power is required for the power supply line 480, and in a parallel arrangement for charging the batteries 620a–b when power is not required. It can be seen that when the charge control line 470 does not receive a recharge signal, the transistor 570 is not conducting and the batteries 620a–b are charged through the resistors 560a–b from the 5 volt power supply 460. When a recharge signal is sent over the charge control line 470, the transistor 570 will conduct and the power supply line 480 will be supplied by the two batteries 620a–b connected in series. In the circuit diagram shown in FIG. 4, the diode 580 will supply the power supply line 480 from the 5 volt power supply 460 if the voltage of the batteries 620a–b are too low, and when a recharge signal is transmitted over the charge control line 470. A plurality of resistors 560a–d can be selected for providing specific voltages to the various components of the module circuit 400.

Figure 5:
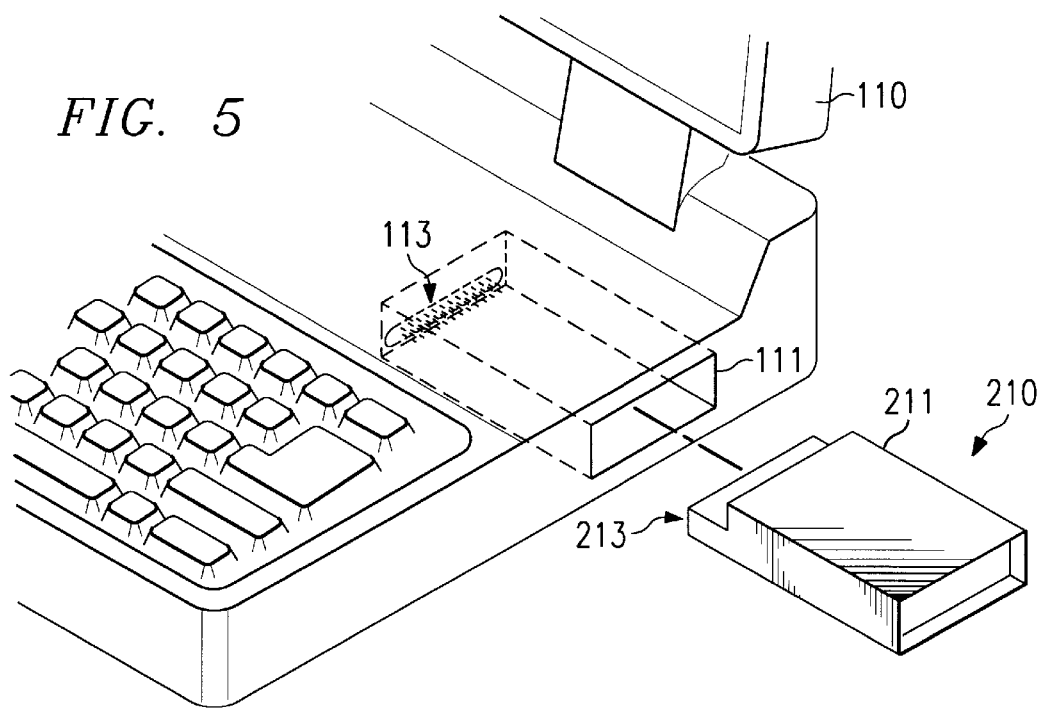
FIG. 5 is an exploded perspective view illustrating the application of a laptop computer using a modular memory unit constructed in accordance with the principles of the present invention.
Figure 6:
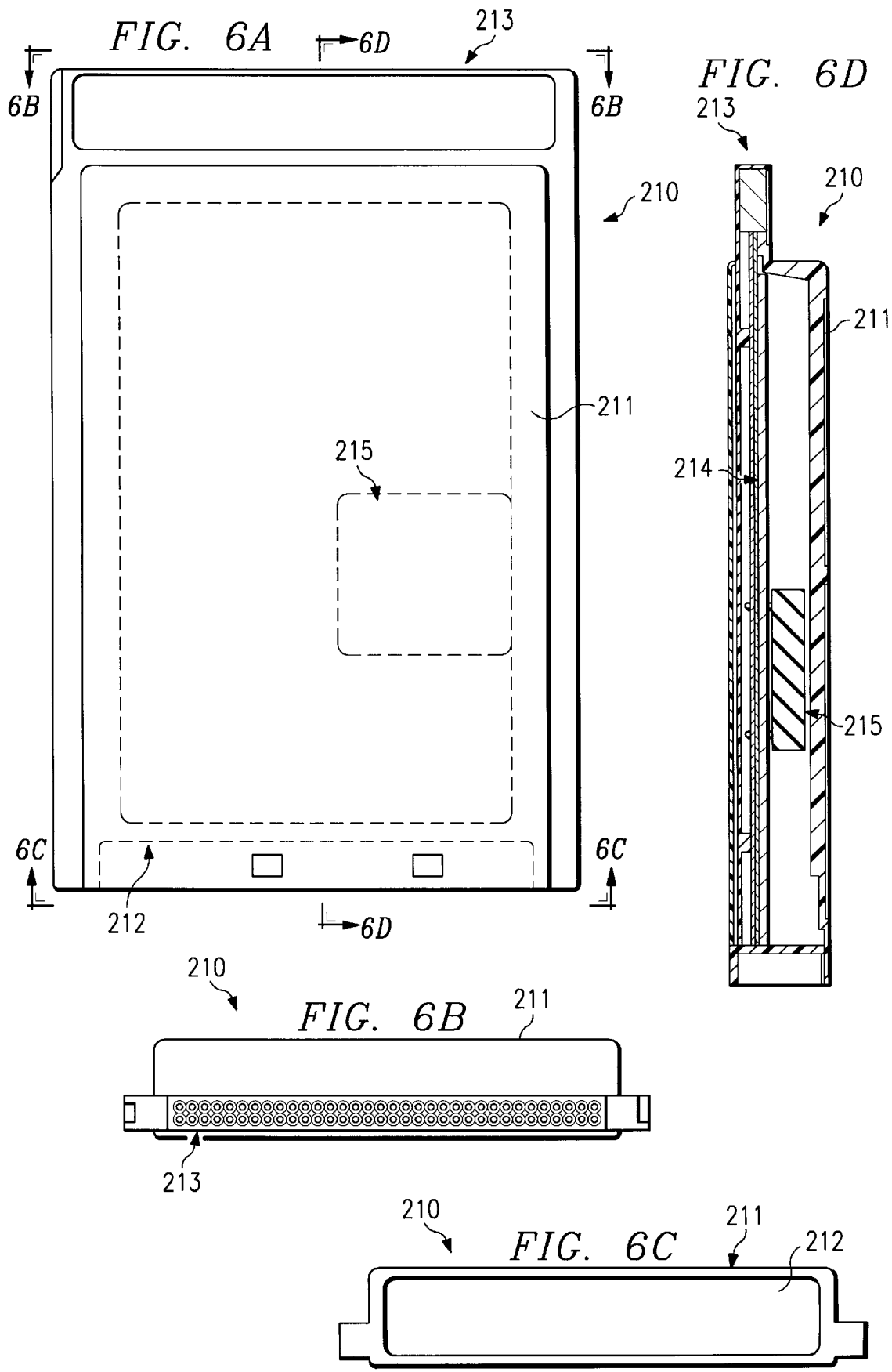
FIG. 6A is a top plan view of the modular memory unit from FIG. 5, and illustrating the various features of that embodiment of the present invention.
FIGS. 6B–D are a front elevational view, a rear elevational view, and a side elevational, cross sectional view, respectively, of the modular memory unit from FIG. 6A, further illustrating the various features of that embodiment of the present invention.

Referring now to FIG. 5, there is shown a modular memory unit, or component, 210, constructed in accordance with the principles of the present invention, for use within a laptop computer 110. The module circuitry, similar to the circuitry illustrated in FIGS. 2–4, can be located in either the laptop computer 110 or the modular memory unit 210. The laptop computer 110 has a computer module compartment 111 and a computer module connector 113. The modular memory unit 210 has a modular body 211 and a module connector 213. The module body 211 of the modular memory unit 210 is designed to fit within the computer module compartment ill of the laptop computer 110. The module connector 213 is designed to connect with the computer module connector 113 when the modular memory unit 210 is inserted within the computer module compartment 111. The design of the computer module compartment 111, the computer modular connector 113, the module body 211, and the module connector 213 can be a standardized design, such as the PCMCIA standard for memory cards. In this manner, modules can be standardized for use in multiple types of host equipment.

Referring now to FIGS. 6A–D in combination there is illustrated the modular memory unit 210 of FIG. 5. The module connector 213 is located on the forward end of the module body 211. The module body 211 houses a printed circuit board 214 which is connected to the module connector 213. A rear panel 212 is located at the rear end of the module body 211 and encloses the printed circuit board 214 within the module body 211. A battery 215 is mounted on the printed circuit board 214 and within the module body 211. Although FIGS. 6A–D illustrates only one battery as the power source, a plurality of batteries could be used connected in a parallel or series arrangement. In one embodiment, the battery 215 is designed to supply all of the power necessary to operate the modular memory unit 210. In another embodiment, the battery 215 is designed to supplement the power from the laptop computer 110 for using in operation the memory module 210. In yet another embodiment, the battery 215 is designed to supply power to the memory module 210 only when the power supplied by the host computer is insufficient for the operating functions of the modular memory unit 210. The battery 215 can be a NiCad type battery or a similar rechargeable battery. The module body 211 can be formed of metal or plastic.

Figure 7:
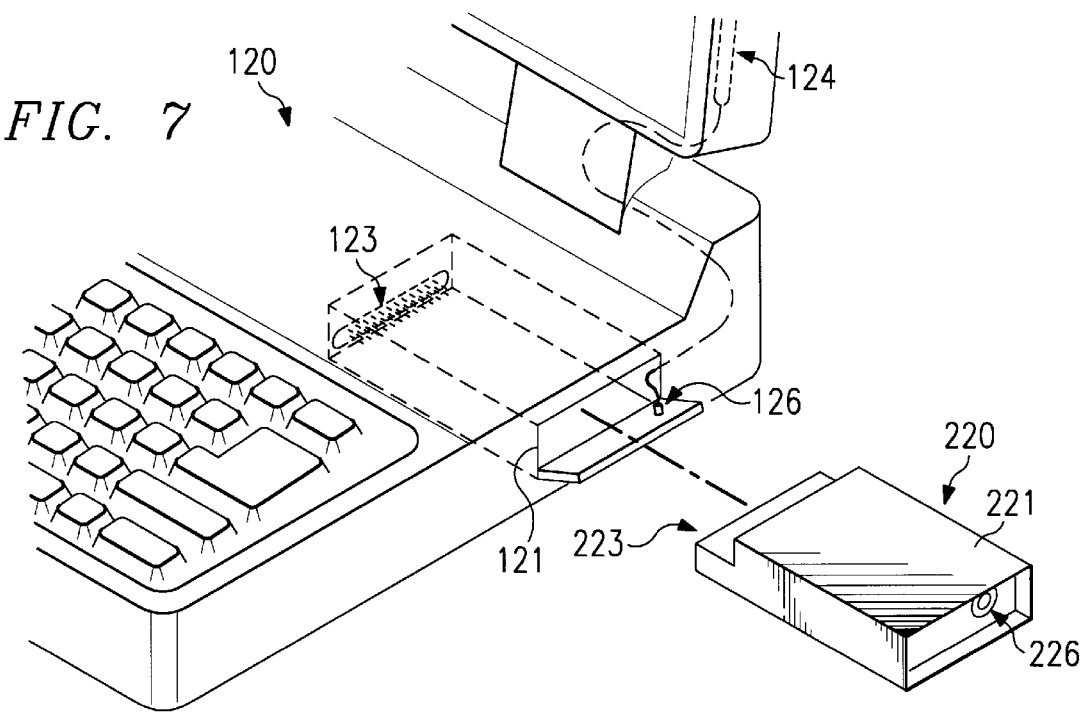
FIG. 7 is an exploded perspective view illustrating the application of a laptop computer using a modular telecommunications unit constructed in accordance with the principles of the present invention.

Referring now to FIG. 7, there is shown a modular telecommunications unit, or component, 220 constructed in accordance with the principles of the present invention, for use within the laptop computer 120. The embodiment as illustrated in FIG. 7 is also constructed according to the principles as taught in the related copending application Ser. No. 08/026,478 which has been previously incorporated above by reference. The module circuitry, similar to the circuitry illustrated in FIGS. 2–4, can be located in either the laptop computer 120 or the modular telecommunications unit 220. The laptop computer 120 contains a computer module compartment 121 having a computer module connector 123, an antenna 124, and a computer antenna connector 126. The module telecommunications unit 220 has a modular body 221 designed to fit within the computer module compartment 121, a module connector 223 designed for interface with the computer module connector 123, and a module antenna connector 226 designed for interface with the computer antenna connector 126.

Referring now to FIGS. 8A–D in combination, there is illustrated the modular telecommunications unit 220 from FIG. 7. The module connector 223 is located on a forward end of the module body 221. The module body 221 houses a printed circuit board 224 which interfaces with the module connector 223. The module antenna connector 226 is mounted on the rear area of the printed circuit board 224. A rear panel 222 encloses the printed circuit board 224 within the modular telecommunications unit 220 and has an aperture which allows access to the module antenna connector 226. A battery 225 is mounted on the printed circuit board 224 for supplying power to the modular telecommunications unit 220. Although FIGS. 8A–D illustrates only one battery as the power source, a plurality of batteries could be used connected in a parallel or series arrangement. In one embodiment, the battery 225 is designed to supply all of the power necessary to operate the modular telecommunications unit 220. In another embodiment, the battery 225 is designed to supplement the power from the laptop computer 120 for use in operating the modular telecommunications unit 220. In yet another embodiment, the battery 225 is designed to supply power to the modular telecommunications unit 220 only when the power supplied by the laptop computer 120 is insufficient for the operating functions of the modular telecommunications unit 220. The battery 225 can be a NiCad type battery or a similar rechargeable battery. The module body 221 can be formed of metal or plastic.

Figure 9:
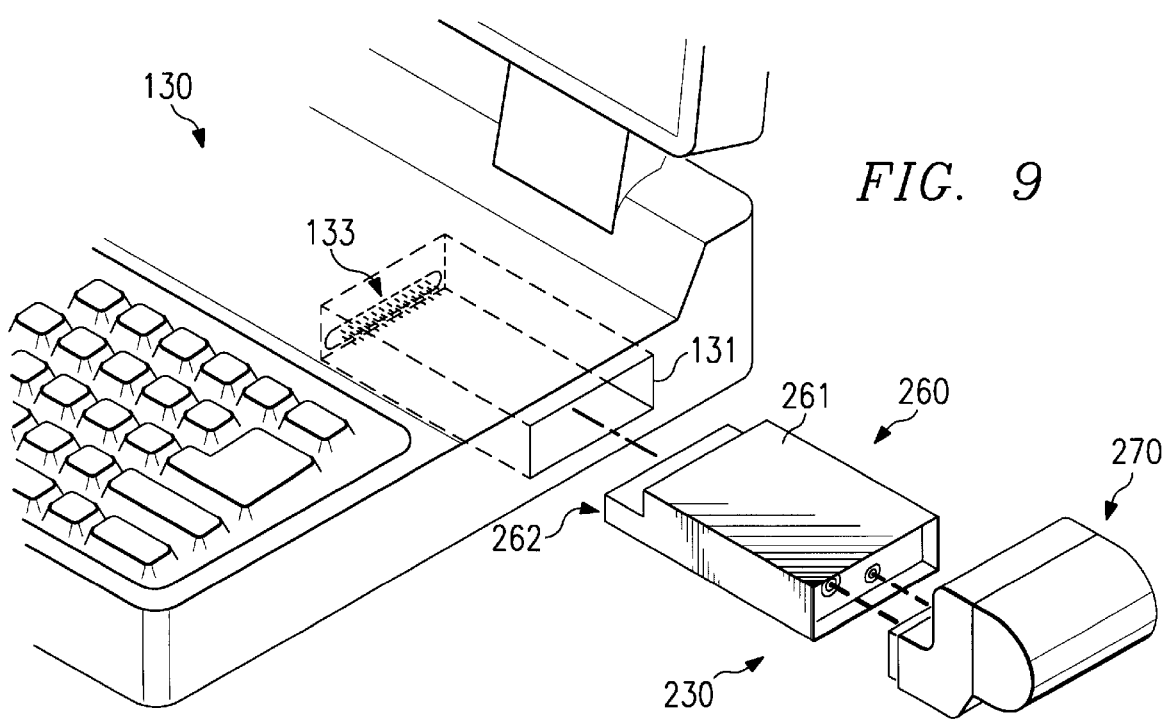
FIG. 9 is an exploded, perspective view illustrating the application of a laptop computer using a modular memory unit having a battery pack and constructed in accordance with the principles of the present invention.

Referring now to FIG. 9, there is shown a modular memory unit 230, constructed in accordance with the principles of the present invention, for use with a laptop computer 130. The laptop computer 130 has a computer module compartment 131 and a computer module connector 133. The modular memory unit 230 is comprised of a modular memory component 260 and a battery pack 270. The modular memory component 260 has a module body 261 designed to fit within the computer module compartment 131, and a module connector 263 which interfaces with the computer module connector 133. The battery pack 270 is designed for interface with the rear end of the modular memory component 260. Although the battery pack 270 is illustrated as extending outside of the computer module compartment 131 when the modular memory unit 230 is plugged into the laptop computer 130, the battery pack 270 could also be designed to be housed within the computer module compartment 131. The module circuitry, similar to the circuitry illustrated in FIGS. 2–4, can be located in either the laptop computer 130, the modular memory component 260, or the battery pack 270.

Referring now to FIGS. 10A–C there is shown the modular memory component 260 of the modular memory unit 230 in FIG. 9. The module body 261 houses the electronic components necessary for performing the functions of the modular memory unit 230. The module connector 263 is located in the forward portion of the module body 261. At the rear end of the module body 261 is a rear panel 262 which allows access to a power connector receptacle 267 within the modular memory component 260. A fastener receptacle 269 for engaging the battery pack fastener 279 is also located within the rear panel 262. The design of the computer module compartment 131, the computer modular connector 133, the module body 261, and the module connector 263 can be a standardized design, such as the PCMCIA standard for memory cards. In this manner, modules can be standardized for use in multiple types of host equipment.

Figure 11:
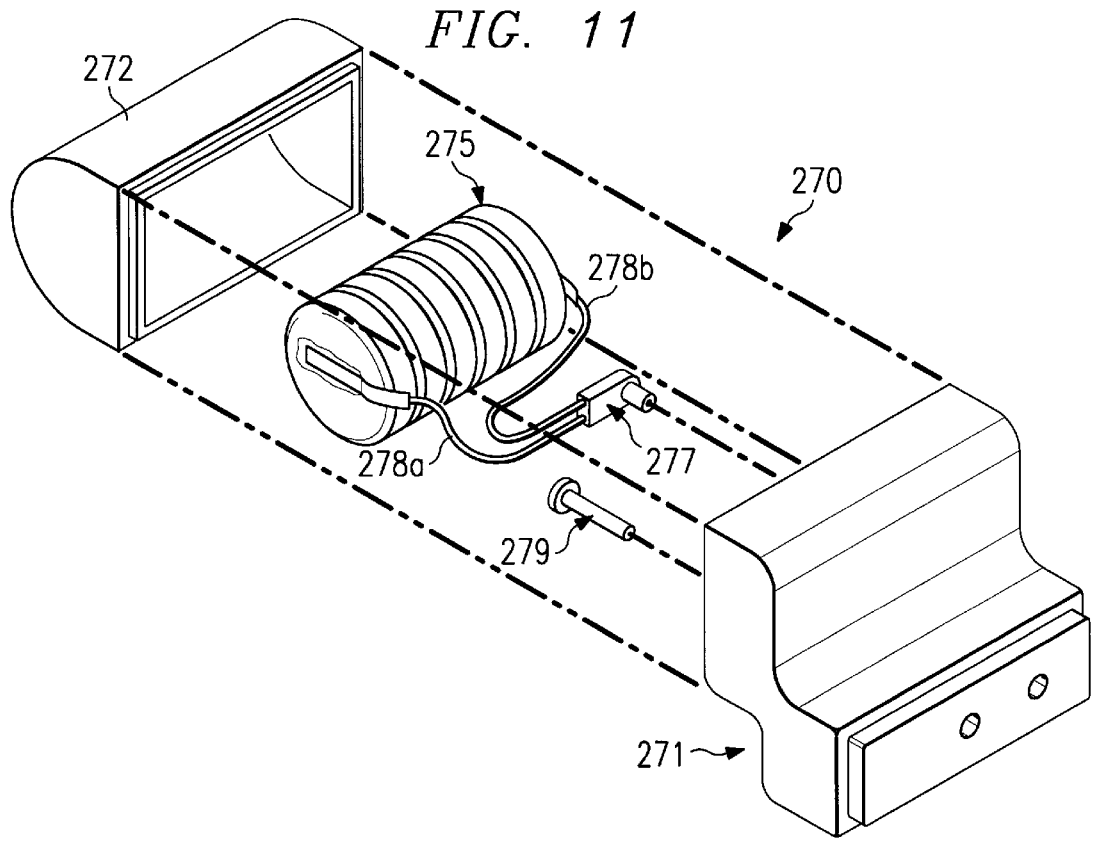
FIG. 11 is an exploded, perspective view of the battery pack of the modular memory unit from FIG. 9, illustrating various features of that embodiment of the present invention.

Referring now to FIG. 11, there is shown an exploded perspective view of the battery pack 270 from the modular memory unit 230 in FIG. 9. The battery pack 270 has a front section 271 and a rear section 272 which house a battery source 275. The battery source 275 can be a plurality of batteries connected together in either a series or a parallel relationship, or a single battery. The batteries used in the battery source 275 can be NiCad type batteries or a similar rechargeable battery. The battery source 275 is connected to a power connector plug 277 by power leads 278a–b. The power connector plug 277 extends out of the front section 271 of the battery pack 270 for engagement with the power connector receptacle 267 located in the modular memory component 260 of FIG. 10. A battery pack fastener 279 is located extending through the front section 271 of the battery pack 270 for engagement with the fastener receptacle 269 located on the modular memory component 260 of FIG. 9.

Referring now to FIGS. 9, 10A–D, and 11 in combination, it can be seen how the battery pack 270 and the modular memory component 260 combine and interface with the laptop computer 130. The front section 271 of the battery pack 270 is adapted for engaging the module body 261 of the modular memory component 260. The power connector plug 277 of the battery pack 270 interfaces with the power connector receptacle 267 of the modular memory component 260. The battery pack fastener 279 engages the fastener receptacle 269, thereby securing the battery pack 270 onto the modular memory component 260. Finally, the modular memory component 260 is positioned within the computer module compartment 131 and the module connector 263 interfaces with the computer module connector 133. In this manner, the modular memory unit 230 can supply the desired functions to the laptop computer 130, and the battery pack 270 can supply power to the modular memory unit 230.

Still referring to FIGS. 9, 10A–D, and 11 in combination, in one embodiment, the battery pack 270 is designed to supply all of the power necessary to operate the modular memory unit 230. In another embodiment, the battery pack 270 is designed to supplement the power from the laptop computer 130 for use in operating the modular memory unit 230. In yet another embodiment, the battery pack 270 is designed to supply power to the modular memory unit 230 only when the power supplied by the laptop computer 130 is insufficient for the operating functions of the modular memory unit 230. A switching device can be located in the power connector receptacle 267 or on the modular memory component 260, which senses the presence of the battery pack 270 and which switches the modular memory unit 230 to a lower power consumption rate when the battery pack 270 is not attached to the modular memory component 260, and a higher power level consumption rate when the battery pack 270 is attached to the modular memory component 260.

Figure 12:
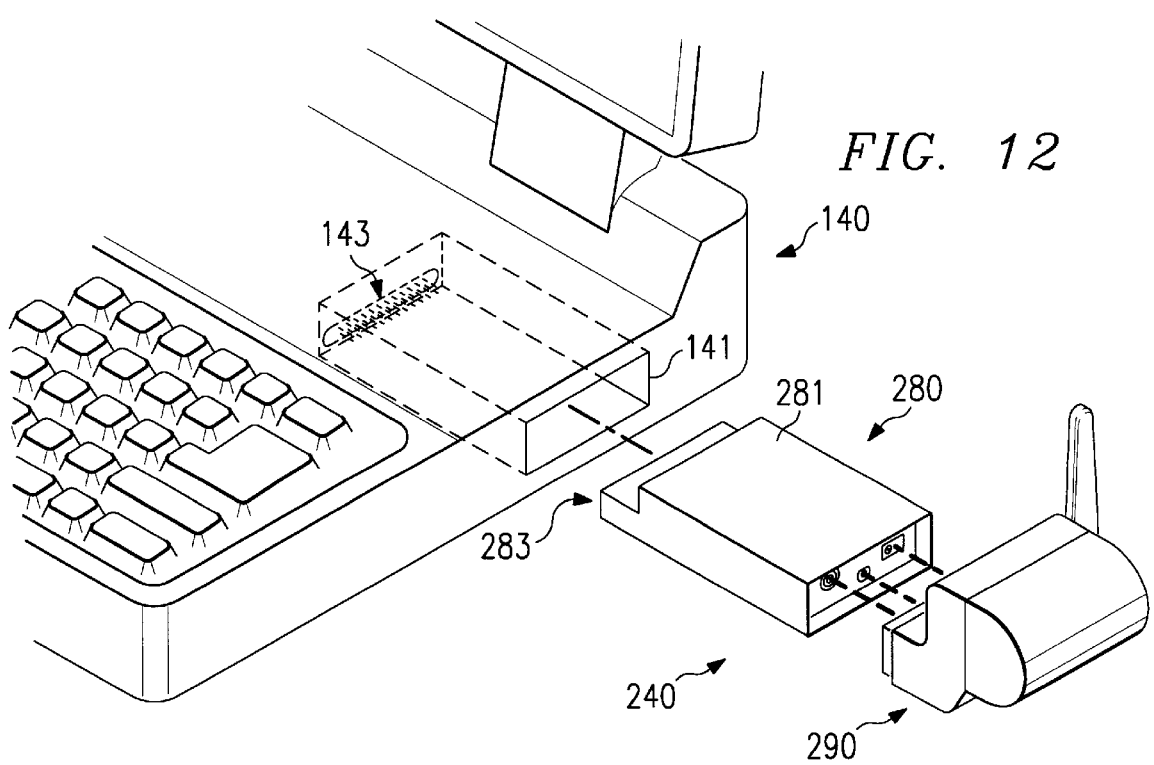
FIG. 12 is an exploded, perspective view illustrating the application of a laptop computer using a modular telecommunications unit having a battery pack, and constructed in accordance with the principles of the present invention.

Referring now to FIG. 12, there is shown a modular telecommunications unit 240 constructed in accordance with the principles of the present invention, and designed for use with a laptop computer 140. The embodiment as illustrated in FIG. 12 is also constructed according to the principles as taught in the related copending application Ser. No. 08/026,478 which has been previously incorporated above by reference. The laptop computer 140 has a computer module compartment 141 and a computer module connector 143. The modular telecommunications unit 240 is comprised of a modular telecommunications component 280 and a battery pack 290. The modular telecommunications component 280 has a module body 281 designed to fit within the computer module compartment 141. The modular telecommunications component 280 also has a module connector 283 designed for interface with the computer module connector 143 of the laptop computer 140. The battery pack 290 is designed for interface with the rear end of the modular telecommunications component 280. Although the modular telecommunications unit 240 is illustrated as having the battery pack 290 extending outside of the computer module compartment 141, the modular telecommunications unit 240 could also be designed to house the battery pack 290 within the computer module compartment 141. The module circuitry, similar to the circuitry illustrated in FIGS. 2–4, can be located in either the laptop computer 140, the modular telecommunications component 280, or the battery pack 290.

Figure 13A:
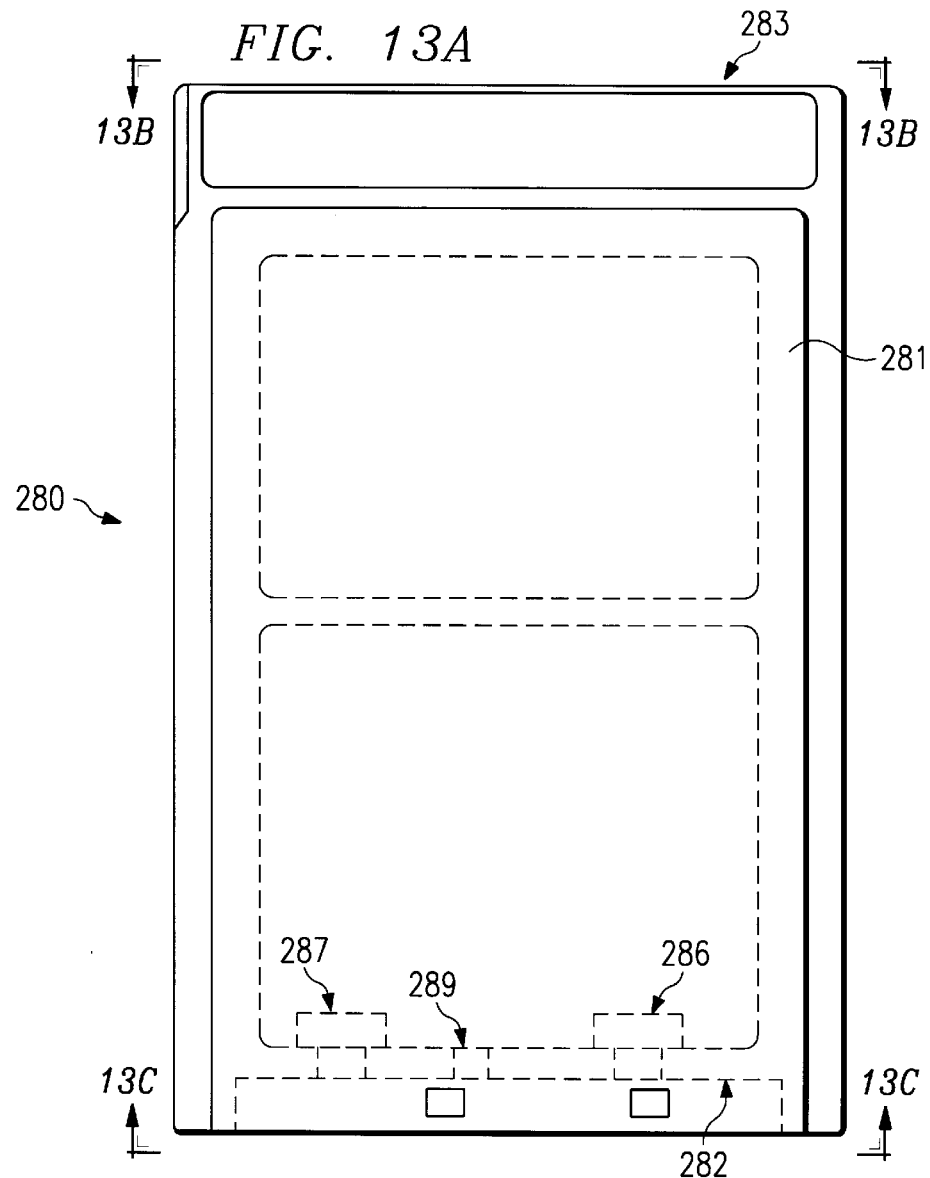
FIG. 13A is a top plan view of the modular telecommunications unit from FIG. 12, without the battery pack, and illustrating various features of that embodiment of the present invention.
Figure 13B:
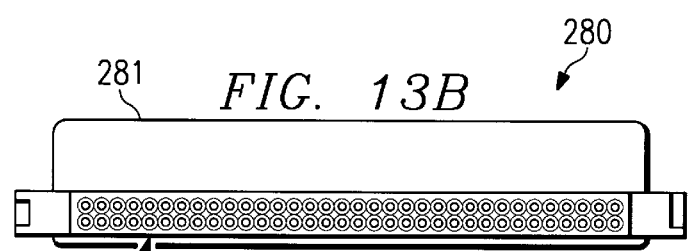
FIGS. 13B–C are front elevational and a rear elevational view, respectively, of the modular telecommunications unit without a battery pack illustrated in FIG. 13A, further illustrating various features of that embodiment of the present invention.
Figure 13C:
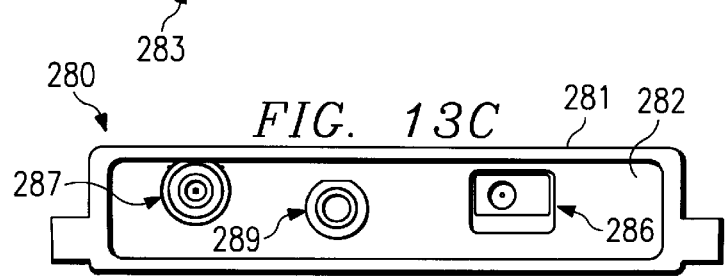

Referring now to FIGS. 13A–C, there is shown the modular telecommunications component 280 of the modular telecommunications unit 240 in FIG. 12. The module body 281 houses the circuitry necessary for performing the functions of the modular telecommunications unit 240. The module connector 283 is located at the forward end of the module body 281. At the rear end of the module body 281 is a rear panel 282 which allows access to a antenna connector receptacle 286 and a power connector receptacle 287 located within the rear area of the modular telecommunications component 280. The rear panel 282 also contains a fastener receptacle 289 for securing the battery pack 290 to the modular telecommunications component 280.

Figure 14:
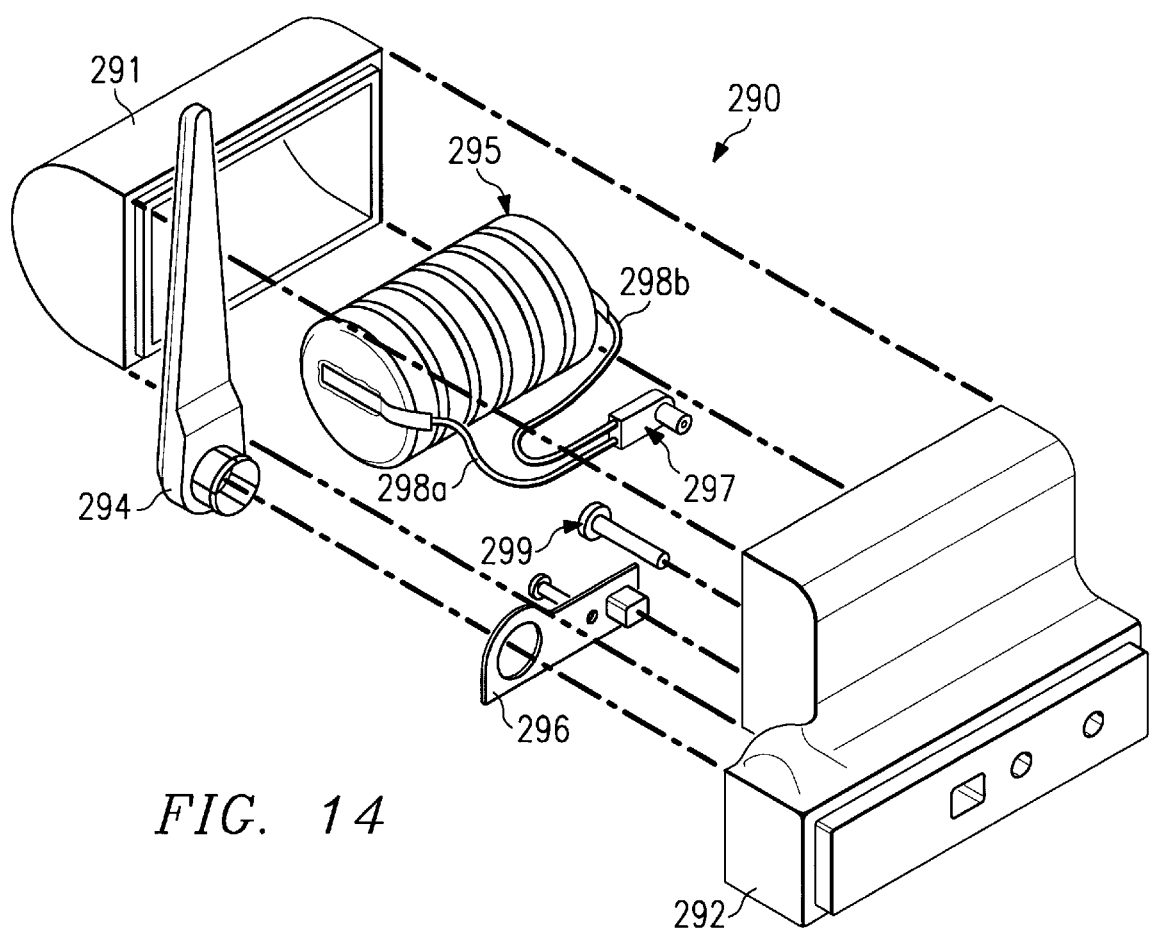
FIG. 14 is an exploded, perspective view of the battery pack of the modular telecommunications unit illustrated in FIG. 12, further illustrating various features of that embodiment of the present invention.

Referring now to FIG. 14, there is shown an exploded perspective view of the battery pack 290 from the modular telecommunications unit 240 in FIG. 12. The battery pack 290 has a front section 291 and a rear section 292 which house a battery source 295. The battery source 295 can be a plurality of batteries connected together in either a series or a parallel relationship, or a single battery. The batteries used in the battery source 295 can be NiCad type batteries or a similar rechargeable battery. The battery source 295 is connected to a power connector plug 297 by power leads 298a–b. The power connector plug 297 extends out of the front section 291 of the battery pack 290 for engagement with the power connector receptacle 287 located in the modular telecommunications component 280 of FIG. 13A–C.

Still referring to FIG. 14, an antenna connector plug assembly 296 is mounted in the front section 291 of the battery pack 290 for engagement with the antenna connector receptacle 286 of the modular telecommunications component 280 in FIG. 13A–C. An antenna 294 rotatably engages the front section 291 of the battery pack 290 and contacts an aperture in the antenna connector plug assembly 296 for supplying electrical continuity between the antenna 294 and the antenna connector plug 296. A battery pack fastener 299 is located extending through the rear section 292 of the battery pack 290 for engagement with the fastener receptacle 289 located on the modular telecommunications component 280 of FIG. 13A–C.

Referring now to FIGS. 12, 13A–C, and 14 in combination, it can be seen how the battery pack 290 and the modular telecommunications component 280 combine and interface with the laptop computer 140. The front section 291 of the battery pack 290 is adapted for engaging the module body 281 of the modular telecommunications component 280. The power connector plug 297 of the battery pack 290 interfaces with the power connector receptacle 287 of the modular telecommunications component 280. The antenna connector plug assembly 296 of the battery pack 290 interfaces with the antenna connector receptacle 286 of the modular telecommunications component 280. The battery pack fastener 299 engages the fastener receptacle 289, thereby securing the battery pack 290 onto the modular telecommunications component 280. Finally, the modular telecommunications component 280 is positioned within the computer module compartment 241 and the module connector 283 interfaces with the computer module connector 143. In this manner, the modular telecommunications unit 240 can supply the desired functions to the laptop computer 140, and the battery pack 290 can supply power to the modular telecommunications component 280 and continuity to the antenna 294.

Still referring to FIGS. 12, 13A–C, and 14 in combination, in one embodiment, the battery pack 290 is designed to supply all of the power necessary to operate the modular telecommunications unit 240. In another embodiment, the battery pack 290 is designed to supplement the power from the laptop computer 140 for use in operation the modular telecommunications unit 240. In yet another embodiment, the battery pack 290 is designed to supply power to the modular telecommunications unit 240 only when the power supplied by the laptop computer 140 is insufficient for the operating functions of the modular telecommunications unit 240. An example of when the power supplied by the laptop computer 140 would be insufficient is when the modular telecommunications unit 240 is operating in a burst transmission mode. A switching device can be located in the power connector receptacle 287 or on the modular telecommunications component 280, which senses the presence of the battery pack 290 and which switches the modular telecommunications component 280 to a lower power consumption rate when the battery pack 290 is not attached to the modular telecommunications component 280, and a higher power level consumption rate when the battery pack 290 is attached to the modular telecommunications component 280.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. A system for providing electrical power to a modular electronic component for use in a host electronic equipment, said host electronic equipment having a power supply, said system comprising:

a load disposed within said modular electronic component;

a connector disposed on said modular electronic component for coupling with said host electronic equipment to electrically connect said host electronic equipment and said modular electronic component; and a battery power source disposed within said modular electronic component and electrically connected to said load;

said load having a higher power consumption level operating mode for use with at least said battery power source, and a lower power consumption level operating mode for use with said power supply in said host electronic equipment but without said battery power source.

2. The system as in claim 1, wherein said battery power source comprises a plurality of batteries connected in series.

3. The system as in claim 1, wherein said load of said modular electronic component comprises a radio transmitter.

4. The system as in claim 1, wherein said modular electronic component comprises means for switching said load between said higher power consumption level operating mode and said lower power consumption level operating mode.

5. The system as in claim 4, wherein, in said higher power consumption level operating mode, said battery power source and said power supply of said host electronic equipment power said load.

6. The system as in claim 4, wherein, in said higher power consumption level operating mode, said battery power source powers said load without assistance from said power supply of said host electronic equipment.

7. The system as in claim 6, wherein said means for switching said load includes means for automatically switching to said higher power consumption level operating mode when said battery power source is able to supply the required electrical power for operation of said load, and for automatically switching to said lower power consumption level operating mode when said battery power source is unable to supply said required electrical power.

8. The system as in claim 1, wherein said modular electronic component comprises a charging circuit adapted to supply a recharge current from said power supply of said host electronic equipment to said battery power source.

9. The system as in claim 8, wherein said charging circuit is adapted to send an amount of recharge current to said battery power source corresponding to the power consumed by said load and based upon an available recharge rate of said recharge current.

10. The system as in claim 8, wherein said battery power source comprises at least two batteries, and wherein said charging circuit connects said at least two batteries in series for powering said load during operation of said load, and wherein said charging circuit connects said at least two batteries in parallel during recharging of said battery power source.

11. The system as in claim 1 wherein said connector is a PCMCIA connector.

12. The system as in claim 1 wherein said modular electronic component is a PCMCIA module.

13. A system for providing electrical power to a modular electronic component for use in a host electronic equipment, said host electronic equipment having a power supply, said system comprising:

a load disposed within said modular electronic component;

a connector disposed on said modular electronic component for coupling with said host electronic equipment to electrically connect said host electronic equipment and said modular electronic component;

a battery power source disposed within said modular electronic component and electrically connected to said load; and a charging circuit disposed within said modular electronic component and adapted to supply an amount of recharge current from said power supply of said host electronic equipment to said battery power source, said amount of recharge current corresponding to the power consumed by said load and based upon an available recharge rate of said recharge current.

14. A system for providing electrical power to a modular electronic component for use in a host electronic equipment, said host electronic equipment having a power supply, said system comprising:

a load disposed within said modular electronic component;

a connector disposed on said modular electronic component for coupling with said host electronic equipment to electrically connect said host electronic equipment and said modular electronic component; and a battery pack removably and physically coupled to said modular electronic component and having a battery power source; and means for conducting electrical power from said battery power source to said load;

said load having a higher power consumption level operating mode for use with at least said battery power source, and a lower power consumption level operating mode for use with said power supply in said host electronic equipment but without said battery power source.

15. The system as in claim 14 wherein said load of said modular electronic component comprises a radio transmitter.

16. The system as in claim 15, further comprising an antenna rotatably mounted to said battery pack and a means for electrically connecting said antenna to said transmitter.

17. The system as in claim 14, wherein said modular electronic component comprises means for switching said load between said higher power consumption level operating mode and said lower power consumption level operating mode.

18. The system as in claim 17, wherein, in said higher power consumption level operating mode, said battery power source and said power supply of said host electronic equipment power said load.

19. The system as in claim 17, wherein, in said higher power consumption level operating mode, said battery power source powers said load without assistance from said power supply of said host electronic equipment.

20. The system as in claim 19, wherein said means for switching said load comprises means for automatically switching to said higher power consumption level operating mode when said battery power source is able to supply the electrical power required for operation of said load, and for automatically switching to said lower power consumption level operating mode when said battery power source is unable to supply said required electrical power.

21. The system as in claim 14 further comprising a charging circuit adapted to supply a recharge current from said power supply of said host electronic equipment to said battery power source.

22. The system as in claim 21, wherein said battery power source comprises at least two batteries, and wherein said charging circuit connects said at least two batteries in series for powering said load during operation of said load, and wherein said charging circuit connects said at least two batteries in parallel during recharging of said battery power source.

23. The system as in claim 21, wherein said charging circuit is adapted to send an amount of recharge current to said battery power source corresponding to the power consumed by said load and based upon an available recharge rate of said recharge current.

24. The system as in claim 21, wherein said charging circuit is disposed within said modular electronic component.

25. The system as in claim 21, wherein said charging circuit is disposed within said battery pack.

26. The system as in claim 14, wherein said connector is a PCMCIA connector.

27. The system as in claim 14, wherein said modular electronic component is a PCMCIA module.

* * * * *

UNITED STATES PATENT AND TRADEMARK OFFICE
CERTIFICATE OF CORRECTION

PATENT NO : 5,845,217
DATED : December 1, 1998
INVENTOR(S) : Lindell, et al.

It is certified that error appears in the above-identified patent and that said Letters Patent are hereby corrected as shown below:

Column 5, line 25  Replace "are front"
With --are a front--

Column 7, line 48  Replace "compartment ill of"
With --compartment 111 of--

Signed and Sealed this

First Day of May, 2001

Attest:

NICHOLAS P. GODICI

Attesting Officer   Acting Director of the United States Patent and Trademark Office